United States Patent [19]

Kagami et al.

[11] Patent Number: 4,834,208

[45] Date of Patent: May 30, 1989

[54] WINDING APPARATUS

[75] Inventors: Yukio Kagami; Toshimasa Yamamoto, both of Aichi, Japan

[73] Assignee: Kabushiki Kaisha Tokai-Rika-Denki-Seisakusho, Japan

[21] Appl. No.: 172,509

[22] Filed: Mar. 24, 1988

[30] Foreign Application Priority Data

Mar. 27, 1987 [JP] Japan ................................ 62-045518

[51] Int. Cl.⁴ ............................................. B60R 22/48
[52] U.S. Cl. .................................... 180/268; 280/804; 280/807; 242/107
[58] Field of Search ............... 280/806, 807, 808, 804; 242/107, 107.4 R; 180/268

[56] References Cited

U.S. PATENT DOCUMENTS

| | | | |
|---|---|---|---|
| 4,564,153 | 1/1986 | Morinaga et al. | 242/107 |
| 4,620,721 | 11/1986 | Scholz et al. | 180/268 |
| 4,669,680 | 6/1987 | Nishimura et al. | 180/268 |
| 4,688,825 | 8/1987 | Arbogast et al. | 180/268 |

FOREIGN PATENT DOCUMENTS

| | | |
|---|---|---|
| 55-7108 | 1/1980 | Japan . |
| 55-87634 | 7/1980 | Japan . |
| 56-73658 | 6/1981 | Japan . |
| 58-78845 | 5/1983 | Japan . |
| 58-101855 | 6/1983 | Japan . |

*Primary Examiner*—Richard A. Bertsch
*Attorney, Agent, or Firm*—Sixbey, Friedman, Leedom & Ferguson

[57] ABSTRACT

A winding apparatus for winding up a webbing is used with an automatic seat belt arrangement in which one end of the webbing is automatically moved and applied to a person sitting in a seat. If it is sensed that nobody uses the webbing, a lever is engaged with a gear wheel which is rotated integrally with a winding shaft for winding up the webbing therearound by means of an urging force, and thus the winding shaft is prevented from being rotated by the urging force in the direction in which the winding shaft winds up the webbing therearound. Accordingly, if nobody uses the webbing, the tension which is applied to the one end of the webbing is cancelled.

16 Claims, 4 Drawing Sheets

WINDING APPARATUS

BACKGROUND OF THE INVENTION

1. Field Of The Invention

The present invention relates to a winding apparatus suitable for use with an automatic seat belt arrangement for automatically applying a webbing to a person sitting in the seat of a vehicle.

2. Description Of The Related Art

Various types of automatic seat belt arrangement capable of automatically applying a webbing to and releasing it from a person sitting in the seat of a vehicle have heretofore been proposed.

Such a typical automatic seat belt arrangement has a structure in which one end portion of a webbing is wound in a winding apparatus disposed in the center of a vehicle and the other end is engaged with a slider which is movable forwardly and rearwardly of the vehicle along a guide rail arranged in the vicinity of a roof side portion of a vehicle, the slider being suitably moved to apply the webbing to or release it from the person. The driving force of a belt operating device is transmitted to the slider through a wire rope capable of transmitting a tension and a compressive force.

More specifically, if the slider is moved along the guide rail in the forward direction of the vehicle, a space which allows the person to sit in the seat is formed between an intermediate portion of the webbing and the seat. When the person sits in the seat, the slider is moved along the guide rail in the reaward direction of the vehicle and the webbing is thus applied to the person.

The stop position of the slider where the webbing is applied to the person is detected by a limit switch, and the slider is stopped at the stop position on the basis of the result of this detection. This limit switch is engaged with the guide rail at a predetermined location so that the webbing can be applied in an optimum manner.

In general, the above-described conventional type of winding apparatus is operated to wind up the webbing when the slider is moved along the guide rail forwardly or rearwardly, and the webbing is thereby always held under tension. Accordingly, the tension of the webbing is applied to the slider and the sliding resistance of the slider increases, with the result that an increased load is applied to the belt operating device.

SUMMARY OF THE INVENTION

It is therefore an object of the present invention to provide a winding apparatus capable of inhibiting the action of winding up a webbing when a person does not use the webbing.

To achieve the above and other object, in accordance with the present invention, there is provided a winding apparatus for winding up a webbing in an automatic seat belt arrangement in which one end of the webbing for holding a person in a seat is automatically moved and applied to the person. The winding apparatus comprises a winding shaft for winding up the webbing therearound by means of a winding force; sensing means for sensing whether or not the webbing has been applied to the person; and anti-winding means for preventing the webbing from being wound around the winding shaft by means of the winding force if the sensing means has sensed that the person does not use the webbing.

In accordance with the present invention, the webbing is prevented from being wound around the winding shaft when nobody is using the webbing. Therefore, when the webbing is not in use, the tension of the webbing applied to the slider is cancelled so that the webbing can be kept slack. Accordingly, the sliding resistance of the slider is reduced and the load level applied to the belt operating device can be kept low.

Further objects, features and advantages of the present invention will become apparent from the following description of a preferred embodiment of the present invention, taken with reference to the accompanying drawings.

DESCRIPTION OF THE PREFERRED EMBODIMENT

A preferred embodiment of a winding apparatus in accordance with the present invention will be described below with reference to the accompanying drawings.

Figure 2:
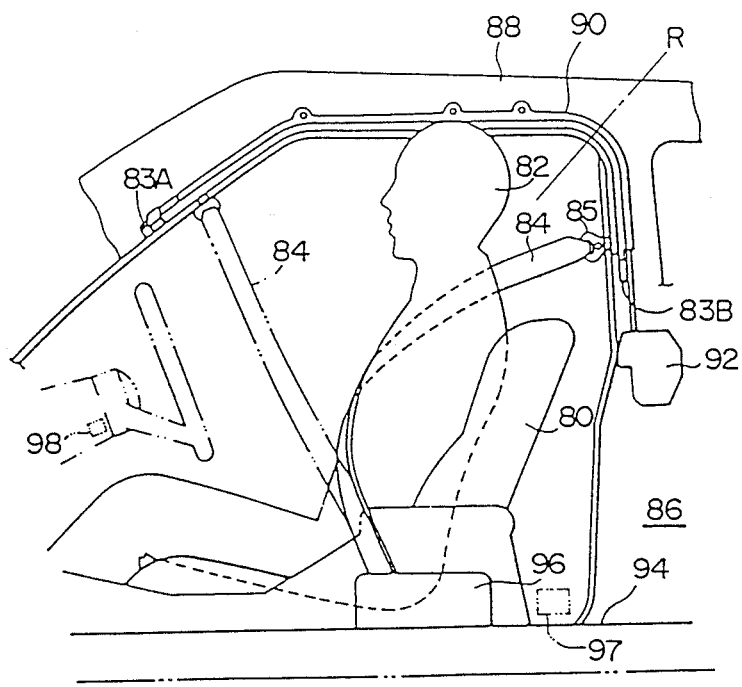
FIG. 2 is a schematic side elevational view of an automatic seat belt arrangement to which the embodiment is applied.

FIG. 2 schematically illustrates the construction of an automatic seat belt arrangement to which the present preferred embodiment is applied. In this illustrated automatic seat belt arrangement, a webbing 84 is adapted to be automatically applied to a person 82 in a seat 80. A slider 85, which is attached to one end of the webbing 84, is guided along a guide rail 90 for movement forwardly and rearwardly of a vehicle, and the guide rail 90 is disposed along a roof side portion 88 of a vehicle body 86 in such a manner as to extend in the longitudinal direction thereof.

The slider 85 is moved forwardly and rearwardly of the vehicle by means of a belt operating device 92 attached to the guide rail 90. When the slider 85 is moved forwardly of the vehicle, the webbing 84 is separated from the person 82 and, when the slider 85 is moved rearwardly of the vehicle, the webbing 84 is automatically applied to the person 82 as shown in FIG. 2. The detailed construction of the belt operating device 92 has previously been disclosed in a prior application (Japanese Patent Laid-open No. 28552/1980) filed by the present inventor.

As shown in FIG. 2, when the slider 85 is moved along the guide rail 90 to its forward end, a normally closed limit switch 83A is opened and, when the slider 85 is moved to the rearward end of the guide rail 90, a normally closed limit switch 83B is opened. A door switch 97 for detecting the opening and closing of a door and a key switch 98 for sensing whether or not an ignition key has been inserted into a key cylinder are also incorporated in the vehicle. It is to be noted that the key switch 98 may be constituted to sense whether or not an ignition has been turned on by the ignition key.

A winding apparatus 96 is mounted on a floor 94 substantially at the center of the vehicle on the side of the seat 80 and opposite the roof side portion 88. The winding apparatus 96 is adapted to wind up the webbing 84 from the other end thereof and store the wound-up portion of the webbing 84.

Figure 1:
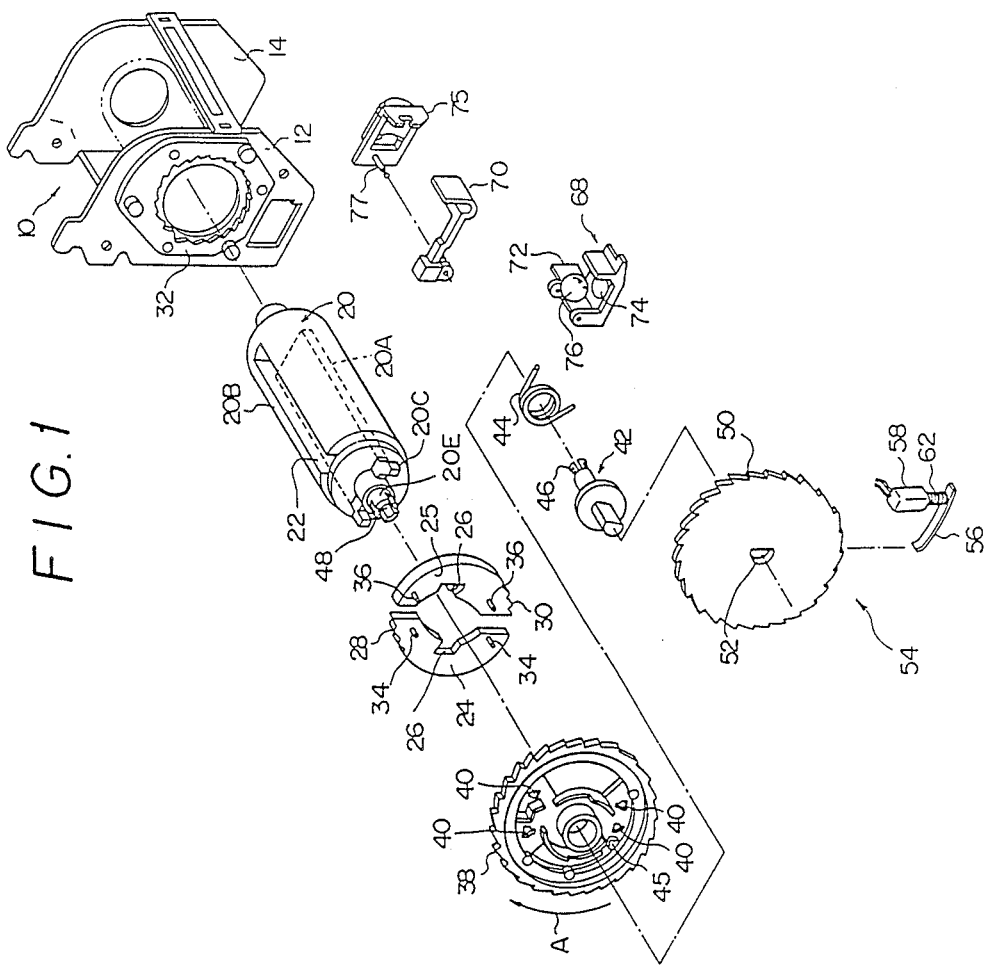
FIG. 1 is an exploded view, in perspective, of one embodiment of a winding apparatus in accordance with the present invention.

As shown in FIG. 1, the winding apparatus 96 has a frame 10 fixed to the floor 94 by means of fixing bolts (not shown). At the opposite axial ends of the frame 10, a pair of support plates 12 and 14 extend parallel to each other.

A winding shaft 20 is supported for rotation about its axis in the opposite axial holes formed in the support plates 12 and 14, and the other end of the webbing 84 is engaged with a slot 22 which extends radially toward the rotational axis of the winding shaft 20. The webbing 84 is wound around the winding shaft 20 in a spiral form, and an intermediate portion of the webbing 84 is applied to the person 82.

The winding shaft 20, which has a columnar shape, is integrally formed of a core metal 20A made from a thick plate and a synthetic resin mold 20B which covers the core metal 20A.

A spiral spring (not shown) is engaged with one end of the synthetic resin mold 20B that is adjacent to the support plate 14, and the winding shaft 20 is urged by the force of the spiral spring in the direction in which the winding shaft 20 winds up the webbing 84.

One end of the core metal 20A projects axially from the other end of the synthetic resin mold 20B, and forms projections 20C.

Lock plates 24 and 25, which constitute a part of a webbing locking means (to be described later), are disposed around the projections 20C. Each of the lock plates 24 and 25 has a substantially U-shaped notch 26 at the middle portion of its inner periphery, and has a substantially C-like configuration as a whole. Each of the projections 20C is fitted in a corresponding one of the notches 26, and thus the lock plates 24 and 25 are capable of rotating integrally with the winding shaft 20. The width of each of the notches 26 is a little larger than that of the corresponding one of the projections 20C so that the lock plates 24 and 25 can be rotated through a predetermined angle with respect to the winding shaft 20.

The lock plates 24 and 25 have toothed portions 28 and 30, respectively, which are respectively formed at one terminal end of the outer periphery of each.

A pair of pins 34 projects axially from the lock plate 24 and a pair of pins 36 likewise projects from the lock plate 25. Each pair of pins 34 and 36 is inserted into a corresponding pair of slots 40 which are formed in a lock wheel 38. A small diameter shaft 20E projects axially from the portion of the winding shaft 20 that corresponds to the center axis thereof, and the lock wheel 38 is supported by the small diameter shaft 20E for rotation with respect to the winding shaft 20.

A torsion coil spring 44 is incorporated in the lock wheel 38. This torsion coil spring 44 is coaxially supported by the lock wheel 38, and one end of the torsion coil spring 44 is secured to a small diameter wheel 42 in such a manner that that one end can move together with the small diameter wheel 42 fitted onto the projecting end of the small diameter shaft 20E, while the other end is engaged with a spring engaging pin 45 which projects axially from the lock wheel 38. The lock wheel 38 is urged by the force of the torsion coil spring 44 so as to rotate in the direction in which the webbing 84 is unwound from the winding shaft 20 (in the direction indicated by an arrow A in FIG. 1). Therefore, the pins 34 and 36 of the lock plates 24 and 25 are respectively held in one corner of the associated slots 40 in the lock wheel 38 by the urging force of the torsion coil spring 44, and thus the toothed portions 28 and 30 are disengaged from an inner ratchet wheel 32.

However, when a relative rotation occurs between the lock wheel 38 and the winding shaft 20 which is rotated in the direction in which the webbing 84 is unwound, the lock wheel 38 is rotated against the urging force of the torsion coil spring 44, but with a certain rotational lag. During the period represented by this lag in rotation, the lock plates 24 and 25 are guided in the longitudinal directions of the corresponding slots 40 and thus the toothed portions 28 and 30 are brought into engagement with the inner ratchet wheel 32.

Figure 3:
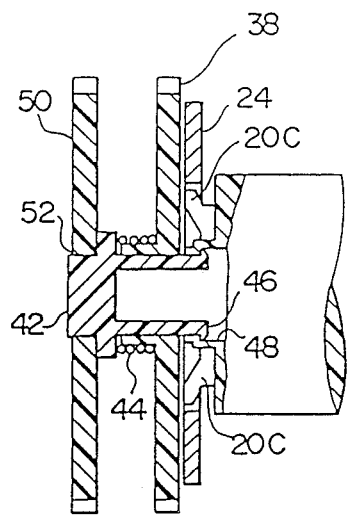
FIG. 3 is a cross sectional view illustrating the manner in which associated parts are mounted to a winding shaft in the embodiment.

As shown in FIG. 3, when a pair of engagement claws 46 is engaged with the inner periphery of a rectangular hole 48 in the winding shaft 20, the small diameter wheel 42 is secured to the winding shaft 20 so that they can be integrally rotated.

The small diameter wheel 42 is fixed in a semi-cylindrical opening 52 which is axially defined in the center of the gear wheel 50 having teeth reverse to those of the lock wheel 38, so that the gear wheel 50 is rotated integrally with the small diameter wheel 42.

An anti-winding device 54 has a lever 56 which is engageable with the gear wheel 50. When the gear wheel 50 is forced to rotate in the direction in which the webbing 84 is unwound after the lever 56 has been engaged with any one of tooth surfaces 50A (shown in FIG. 4) of the gear wheel 50, the lever 56 is rotated counterclockwise and pushed radially outwardly by the movement of a slide surface 50B adjacent to the corresponding tooth surface 50A since the slide surfaces 50B are formed as inclined surfaces.

Figure 4:
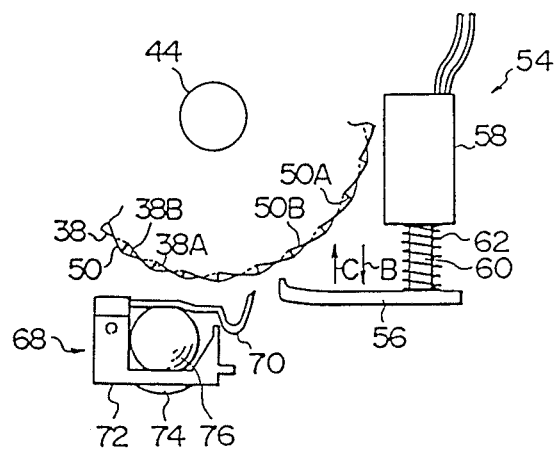
FIG. 4 is a schematic view illustrating the operation of an anti-winding device in the embodiment.
Figure 5:
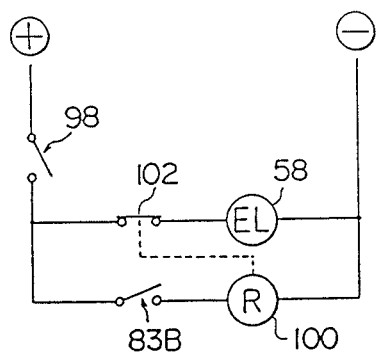
FIG. 5 is a circuit diagram illustrating a circuit for operating an electromagnet in the embodiment.

As shown in FIG. 5, when a key switch 98 and a B contact 102 of a relay 100 are closed, an electromagnet 58 is energized to cause a shaft 60 to move in the direction indicated by an arrow B in FIG. 4, thereby disengaging the lever 56 from the gear wheel 50. On the other hand, when a key switch 98 and a limit switch 83B are closed, the solenoid coil of the relay 100 is energized. Thus, the B contact 102 of the relay 100 is oopened and hence the electromagnet 58 is de-energized, so that the shaft 60 is moved in the direction indicated by an arrow C in FIG. 4 by the action of a coil spring 62 to bring the lever 56 into engagement with the gear wheel 50.

A pole lever 70, which is pivotally supported by an acceleration sensor 68, is adapted to engage with the lock wheel 38. When the gear wheel 38 is forced to rotate in the direction in which the webbing 84 is unwound after the pole lever 56 has been engaged with any one of tooth surfaces 38A (shown in FIG. 4) of the lock wheel 38, the pole lever 70 is rotated clockwise (as shown in FIG. 4) and pushed radially outwardly by the movement of a slide surface 38B adjacent to the corresponding tooth surface 38A since the slide surfaces 38B are formed as inclined surfaces.

The acceleration sensor 68 is constructed so that a ball 76, which is disposed in a conical receiving portion 74 of a case 72, can roll upwardly in the conical receiving portion 74 by the action of acceleration.

The pole lever 70 is supported pivotally about a pin 77 attached to a mounting bracket 75 which is mounted to the support plate 12, and an intermediate portion of the pole lever 70 is adapted to come into contact with the ball 76.

When the ball 76 is pushed upwardly, the pole lever 70 is rotated by the movement of the ball 76 and thus the free end of the pole lever 70 is brought into engagement with the lock wheel 38.

Figure 6:
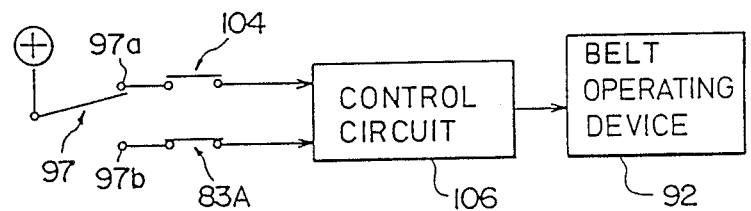
FIG. 6 is a circuit diagram illustrating a circuit for operating a belt operating device in the embodiment.

The belt operating device 92 shown in FIG. 2 is operated as follows. As shown in FIG. 6, when a door is opened, the door switch 97 is closed and connected to a contact 97a. Thus, when an A contact 104 of the relay 100 is closed, a control circuit 106 is operated to cause the slider 85 to move forwardly of the vehicle. On the other hand, when the door is closed, the door switch 97 is opened and connected to a contact 97b. Thus, when a limit switch 83A is closed, the control circuit 106 is operated to cause the slider 85 to move rearwardly of the vehicle.

The following is a description of the operation of the present preferred embodiment which is arranged as described above.

The slider 85 is initially located at the rearward end of the guide rail 90 and the limit switch 83B is off until the slider 85 is moved to the forward end of the guide rail 90.

When the person 82 opens the door, the door switch 97 is opened and the belt operating device 92 is operated to cause the slider 85 to move along the guide rail 90 forwardly of the vehicle, and the limit switch 83A is opened. Thus, since a space is formed between the floor 94 and the seat 80, the person 82 can readily sit in the seat 80.

At this time, the key switch 98 are off and the electromagnet 58 is not energized since the ignition key has not yet inserted in the key cylinder. Therefore, the lever 56 of the winding apparatus 96 stays in engagement with the gear wheel 50 to prevent the webbing 84 from being wound around the winding shaft 20. The pole lever 70 of the winding apparatus 96 stays out of engagement with the lock wheel 38 since the webbing 84 is extracted by the movement of the slider 85 with a relatively small degree of acceleration. Therefore, the webbing 84 can be extracted. When the webbing 84 is extracted to its maximum extraction point (a corner R of the guide rail 90) (refer to FIG. 2), the webbing 84 is extracted no further and, subsequently, the webbing 84 is moved to the forward end of the guide rail 90 with approximately 50 mm slack in its length.

When the person 82 sits in the seat 80 and closes the door, the door switch 97 is closed so that the belt operating device 92 is operated to move the slider 85 to the rearward end of the guide rail 90. Thus, the limit switch 83B is opened.

At this time, in the same manner as described above, the pole lever 70 of the winding apparatus 96 stays out of engagement with the lock wheel 38. Therefore, the person 82 who uses the webbing 84 can assume a free driving position by extracting an arbitrary length of the webbing 84 which is wound around the winding shaft 20.

After passing the maximum extraction point, the slider 85 together with the webbing 84 which is somewhat slack is moved to the rearward end of the guide rail 90. At this point in time, when the person 82 inserts the ignition key into the key cylinder, the key switch 98 is closed. However, since the limit switch 83B is off, the slenoid coil of the relay 100 is deenergized, the B contact 102 of the relay 100 is closed, and the electromagnet 58 is energized. Thus, the lever 56 of the winding apparatus 96 is disengaged from the gear wheel 50 and the webbing 84 is wound around the winding shaft 20, so that the person 82 is held in the seat 80 by the webbing 84.

Should the vehicle which is driven by the person 82 held by the webbing 84 collide against an object, the ball 76 in the winding apparatus 96 rolls upwardly in the conical receiving portion 74 to cause the pole lever 70 to rotate and engage with the lock wheel 38.

Simultaneously, since the person 82 is moved due to inertia in the direction in which acceleration acts, the webbing 84 wound around the winding shaft 20 is rapidly extracted from the winding apparatus 96 so that the winding shaft 20 is rotated clockwise as viewed in FIG. 1. Therefore, although the lock wheel 38 is rotated together with the winding shaft 20, the rotation of the lock wheel 38 is hindered by the pole lever 70, and thus a relative rotation occurs between the lock wheel 38 and the winding shaft 20.

The torsion coil spring 44 is deformed by the action of the relative rotation, and the pins 34 and 36 of the lock plates 24 and 25 which are rotated together with the winding shaft 20 are respectively guided along the corresponding ones of the slots 40 formed in the lock wheel 38 until the toothed portions 28 and 30 are brought into engagement with the inner ratchet wheel 32. Thus, the winding shaft 20 is prevented from being rotated in the direction in which the webbing 84 is unwound. In consequence, the person 82 is securely held by the webbing 84.

When the person 82 stops normal driving and opens the door to get off the vehicle, the door switch 97 is opened and the belt operating device 92 is operated to cause the slider 85 to move to the forward end of the guide rail 90. Thus, the person 82 is released from the webbing 84.

At this point in time, when the slider 85 is moved away from the rearward end of the guide rail 90, the limit switch 83B is closed and the electromagnet 58 of the winding apparatus 96 is de-energized. Thus, the lever 56 is brought into engagement with the wheel gear 50 so tht the winding shaft 20 can be prevented from winding up the webbing 84 therearound. In this state, the webbing 84 is extracted to its maximum extraction point (the corner R of the guide rail 90) (refer to FIG. 2). Subsequently, since the webbing 84 is extracted no further, the webbing 84 is moved to the forward end of the guide rail 90 with a slack in its length. During this time, if the person 82 is to extract the webbing 84, no problem occurs since the locked state of the webbing 84 is cancelled.

When the person 82 closes the door after getting off the vehicle, the door switch 97 is closed and the belt operating device 92 is operated to move the slider 85 along the guide rail 90 from forward end to rearward end. The webbing 84 is moved with a slack in its length. When the slider 85 is moved to the rearward end of the guide rail 90, the limit switch 83B is opened. In this state, since the person 82 has pulled the ignition key off the key cylinder, the key switch 98 has been opened and the electromagnet 58 has been de-energized so that the webbing 84 has ben kept slack.

Accordingly, when the person 82 again rides in the vehicle, the slider 85 is moved to the forward end of the guide rail 90, together with the webbing 84 with a slack in its length, except when the slider 85 passes the maximum extraction point (the corner R of the guide rail 90).

The slack in a webbing for an assistant drivers' seat is stored in a control circuit irrespective of the position of a corresponding slider.

As described above, while the slider is being moved forwardly or rearwardly of the vehicle, the winding apparatus does not wind up the webbing and hence the magnitude of resistance acting upon the sliding movement of the slider is reduced. Therefore, since the slider can be moved without the need for a large torque, the belt operating device can be made compact and hence friction between the slider and the guide rail can be reduced. It is therefore possible to achieve increases in durability and reliability as well as a reduction in noise. Since the webbing has a certain degree of slack, the person does not experience the webbing rubbing strongly against his face, and the forces which act to press against his chest when the webbing is in place are reduced.

It is to be noted that the above-described winding apparatus can be applied to a winding apparatus provided with a device for detecting the acceleration of a vehicle or a device for detecting the rapid extraction of a webbing, in addition to the previously-described acceleration sensor.

It will be appreciated from the foregoing that, in accordance with the present invention, unless the person uses the webbing, the action of winding up the webbing is inhibited. Therefore, the forces which act to press against his chest when the webbing is in use are reduced, and the tension of the webbing is not continuously applied to parts for moving the webbing. Accordingly, it is possible to produce the effect of protecting the parts from damage.

What is claimed is:

1. For use with an automatic seat belt arrangement in which one end of a webbing includes a slider movable between a person restraining position and a person releasing position for holding the person in a seat with said webbing being automatically moved and applied to said person, a winding apparatus for winding up said webbing, comprising:
    a winding shaft for winding said webbing therearound by means of a winding force;
    sensing means for sensing whether or not said webbing has been applied to said person, said sensing means including a switch means cooperating with said slider for indicating when said slider reaches said person restraining position for restraining the person with said webbing; and
    anti-winding means for preventing said webbing from being wound around said winding shaft by means of said winding force if said sensing means has sensed that said person does not use said webbing.

2. A winding apparatus according to claim 1, wherein said anti-winding means includes a gear wheel rotated integrally with said winding shaft and a lever engageable with said gear wheel for preventing said winding shaft from rotating in the direction in which said webbing is wound up.

3. A winding apparatus according to claim 2, wherein said anti-winding means further includes driving means for causing said lever to be moved in the directions in which said lever engage with and disengage from said gear wheel.

4. A winding apparatus according to claim 3, wherein said gear wheel has inclined surfaces which enable said winding shaft to be rotated in the direction in which said webbing is unwound therefrom in a state wherein said gear wheel is engaged with said lever.

5. A winding apparatus according to claim 4, wherein said driving means includes urging means for moving said lever by means of its urging force in the direction in which said lever engages with said gear wheel and an electromagnet which can be energized to disengage said lever from said gear wheel against said urging force of said urging means.

6. A webbing apparatus according to claim 5, wherein said driving means includes a limit switch for energizing a relay to deenergize said electromagnet when said limit switch is turned on.

7. For use with an automatic seat belt arrangement in which a slider engaged with one end of a webbing for holding a person in a seat is automatically moved and is applied to and released from said person, a winding apparatus for winding up said webbing from the other end thereof, comprising:
    a winding shaft for winding said webbing therearound by means of a winding force, the other end of said webbing being engaged with said winding shaft;
    sensing means for sensing whether or not said webbing has been applied to said person; and
    a ratchet wheel arranged to be rotated integrally with said winding shaft;
    a lever engageable with said ratchet wheel for preventing said winding shaft from rotating in the direction in which said webbing is wound up by means of said winding force; and
    driving means for engaging said lever with said ratchet wheel if said sensing means has sensed that said person does not use said webbing.

8. A winding apparatus according to claim 7, wherein said ratchet wheel has inclined surfaces which enable said winding shaft to be rotated in the direction in which said webbing is unwound therefrom in a state wherein said ratchet wheel is engaged with said lever.

9. A winding apparatus according to claim 8, wherein said driving means includes urging means for moving said lever by means of its urging force in the direction in which said lever engages with said ratchet wheel and an electromagnet which can be energized to disengage said lever from said gear wheel against said urging force of said urging means.

10. A winding apparatus according to claim 9, wherein said sensing means includes an ignition key switch for a vehicle.

11. A webbing apparatus according to claim 10, wherein said driving means includes a limit switch for energizing a relay to deenergize said electromagnet when said limit switch is turned on while said ignition key switch is on.

12. For use with an automatic seat belt arrangement in which a slider engaged with one end of a webbing for holding a person in a seat is automatically moved and is applied to and released from said person, a winding apparatus for winding up said webbing, comprising:
    a winding shaft for winding said webbing from the other end thereof around said winding shaft in spiral form by means of its winding force, said other end being engaged with said winding shaft;
    a lock wheel rotatably supported by said winding shaft for preventing said winding shaft from rotating in the direction in which said webbing is unwound therefrom when a relative rotation occurs between said winding shaft and said lock wheel;

sensing means for sensing whether or not said webbing has been applied to said person; and a ratchet wheel having a plurality of tooth portions formed around its outer periphery and axially fixed to said winding shaft for integral rotation with said winding shaft;

a lever engageable with said ratchet wheel for preventing said winding shaft from rotating in the direction in which said webbing is wound up by means of said winding force; and driving means for engaging said lever with said tooth portions of said ratchet wheel if said sensing means has sensed that said person does not use said webbing.

13. A winding apparatus according to claim 12, wherein said ratchet wheel has inclined surfaces between each adjacent one of said tooth portions which surfaces enable said winding shaft to be rotated in the direction in which said webbing is unwound therefrom in a state wherein said ratchet wheel is engaged with said lever.

14. A winding apparatus according to claim 13, wherein said driving means includes a spring for moving said lever by means of its urging force in the direction in which said lever engages with said ratchet wheel and an electromagnet which can be energized to disengage said lever from said gear wheel against said urging force of said spring.

15. A winding apparatus according to claim 14, wherein said sensing means includes an ignition key switch for a vehicle.

16. A webbing apparatus according to claim 12, wherein said driving means includes a limit switch for energizing a relay to deenergize said electromagnet when said limit switch is turned on while said ignition key switch is on.

* * * * *